(12) United States Patent
Tanaka et al.

(10) Patent No.: US 12,103,243 B2
(45) Date of Patent: Oct. 1, 2024

(54) WELDING METHOD

(71) Applicant: MITSUBISHI HEAVY INDUSTRIES, LTD., Tokyo (JP)

(72) Inventors: Daisuke Tanaka, Tokyo (JP); Shogo Otobe, Tokyo (JP); Yoichiro Tsumura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/542,893

(22) Filed: Dec. 6, 2021

(65) Prior Publication Data

US 2022/0363014 A1 Nov. 17, 2022

(30) Foreign Application Priority Data

May 13, 2021 (JP) .................. 2021-081629

(51) Int. Cl.
*B29C 65/34* (2006.01)
*B29C 70/06* (2006.01)

(52) U.S. Cl.
CPC .............. *B29C 65/34* (2013.01); *B29C 70/06* (2013.01)

(58) Field of Classification Search
CPC ....... B29C 65/34; B29C 70/06; B29C 70/202; B29C 70/207; B29C 70/22; B29C 70/228
See application file for complete search history.

(56) References Cited

U.S. PATENT DOCUMENTS

| | | | |
|---|---|---|---|
| 2009/0107620 A1 | 4/2009 | Hasegawa et al. | |
| 2011/0064908 A1* | 3/2011 | Kweder | B29C 70/345 428/113 |
| 2014/0295726 A1* | 10/2014 | Kozar | F41H 5/0407 428/221 |

FOREIGN PATENT DOCUMENTS

| | | | |
|---|---|---|---|
| JP | 2006-315040 A | | 11/2006 |
| JP | 2009-107515 A | | 5/2009 |
| JP | 5560121 B2 | | 7/2014 |
| JP | 2015168137 A | * | 9/2015 |
| JP | 6358818 B2 | | 7/2018 |

OTHER PUBLICATIONS

Translation of JP2015168137A, Sep. 2015, Nishiyabu K (Year: 2015).*

* cited by examiner

*Primary Examiner* — George R Koch
(74) *Attorney, Agent, or Firm* — HAUPTMAN HAM, LLP

(57) ABSTRACT

Provided is a welding method including: a sheet disposition process of disposing a first and a second protection sheet such that the first and the second protection sheet come into contact with a first and a second composite material and disposing an energization sheet such that the energization sheet comes into contact with the first and the second protection sheet; and a welding process of applying a voltage to a pair of electrode portions disposed at the energization sheet and welding the first and the second composite material, the energization sheet contains the carbon fiber base material oriented in a first predetermined direction connecting the pair of electrode portions, and the first and the second protection sheet contain the carbon fiber base material oriented in a second predetermined direction that substantially perpendicularly intersects the first predetermined direction.

5 Claims, 12 Drawing Sheets

FIG. 8

|  | COMPARATIVE EXAMPLE | PRESENT EMBODIMENT |
|---|---|---|
| TEMPERATURE AT MEASUREMENT POINT P1 | 344°C | 310°C |
| TEMPERATURE AT MEASUREMENT POINT P2 | 311°C | 312°C |
| TEMPERATURE AT MEASUREMENT POINT P3 | 312°C | 317°C |

WELDING METHOD

CROSS-REFERENCE TO RELATED APPLICATIONS

This application claims priority to Japanese Patent Application No. 2021-081629 filed May 13, 2021, the contents of which are incorporated herein by reference in its entirety.

BACKGROUND

1. Technical Field

The present disclosure relates to a welding method of welding a first composite material and a second composite material, each of which contains a carbon fiber base material and a thermoplastic resin, and a structure.

2. Description of Related Art

As a method of welding a pair of composite materials configured with fiber reinforced thermoplastic, a method of disposing a carbon fiber sheet between the pair of composite materials, causing a current to flow therethrough, and melting contact parts of the composite materials with the carbon fiber sheet is known (for example, see the Publication of Japanese Patent No. 6358818).

Also, a method of disposing a resistance heating element provided with an insulating layer between a pair of composite materials, energizing the resistance heating element, and thereby melting contact parts of the pair of composite materials with the insulating layer is known (for example, see the Publication of Japanese Patent No. 5560121).

BRIEF SUMMARY

The Publication of Japanese Patent No. 6358818 discloses that bonding strength is enhanced by setting a fiber direction of the carbon fiber sheet, which is used as a resistance heating element, to be parallel to an energization direction. However, in a case in which a relationship between the fiber direction of the carbon fiber base material disposed on the surfaces of the composite materials and the energization direction is not appropriate, bonding states of the pair of composite materials do not become uniform in an in-plane direction.

This is because the carbon fiber base material is contained in the pair of composite materials bonded via the carbon fiber sheet, a part of the current flowing through the carbon fiber sheet flows through the carbon fiber base material contained in the composite materials, and the amount of generated heat of the carbon fiber sheet does not become uniform in the in-plane direction. For example, in a case in which the fiber direction of the carbon fiber base material disposed on the surfaces of the composite materials is at 45 degrees with respect to the energization direction, the current more easily flows through the carbon fiber base material disposed on the surfaces of the composite materials, and there is a high likelihood that heat is locally and excessively generated.

On the other hand, according to the Publication of Japanese Patent No. 5560121, the resistance heating element provided with the insulating layer is disposed between the pair of composite materials, and therefore, a current does not flow through the carbon fiber base material disposed on the surfaces of the composite materials. However, according to the Publication of Japanese Patent No. 5560121, a metal material such as aluminum, which is illustrated as an example of the resistance heating element, remains as a foreign matter in the bonding parts.

The present disclosure was made in view of such circumstances, and an object thereof is to provide a welding method and a structure that enable appropriate welding between a first composite material and a second composite material, each of which contains a carbon fiber base material and a thermoplastic resin, over an entire region of a bonding region where the first composite material and the second composite material come into contact with each other when the first composite material and the second composite material are welded.

A welding method according to an aspect of the present disclosure is a welding method of welding a first composite material and a second composite material, each of which contains a carbon fiber base material and a thermoplastic resin, the method comprising: a sheet disposition process of disposing a first protection sheet such that the first protection sheet comes into contact with a first bonding surface of the first composite material, disposing a second protection sheet such that the second protection sheet comes into contact with a second bonding surface of the second composite material, and disposing an energization sheet such that the energization sheet comes into contact with the first protection sheet and the second protection sheet; an electrode disposition process of disposing a pair of electrode portions such that the electrode portions come into contact with a pair of end portions of the energization sheet; and a welding process of applying a voltage to the pair of electrode portions and welding the first composite material and the second composite material, wherein each of the first protection sheet, the second protection sheet, and the energization sheet contains the carbon fiber base material oriented unidirectionally and the thermoplastic resin, the energization sheet contains the carbon fiber base material oriented in a first predetermined direction connecting the pair of electrode portions, and the first protection sheet and the second protection sheet contain the carbon fiber base material oriented in a second predetermined direction that substantially perpendicularly intersects the first predetermined direction.

A structure according to an aspect of the present disclosure is a structure in which a first composite material and a second composite material are welded, each of the first composite material and the second composite material containing a carbon fiber base material and a thermoplastic resin, the structure comprising: the first composite material; the second composite material; a first protection sheet disposed such that the first protection sheet comes into contact with a first bonding surface of the first composite material; a second protection sheet disposed such that the second protection sheet comes into contact with a second bonding surface of the second composite material; and an energization sheet disposed such that the energization sheet comes into contact with the first protection sheet and the second protection sheet, wherein each of the first protection sheet, the second protection sheet, and the energization sheet contains the carbon fiber base material oriented unidirectionally and the thermoplastic resin, the energization sheet contains the carbon fiber base material oriented in a first predetermined direction connecting a pair of end portions, and the first protection sheet and the second protection sheet contain the carbon fiber base material oriented in a second predetermined direction that substantially perpendicularly intersects the first predetermined direction.

According to the present disclosure, it is possible to provide a welding method and a structure that enable appropriate welding between a first composite material and a second composite material, each of which contains a carbon fiber base material and a thermoplastic resin, over an entire region of a bonding region where the first composite material and the second composite material come into contact with each other when the first composite material and the second composite material are welded.

BRIEF DESCRIPTION OF THE SEVERAL VIEWS OF THE DRAWINGS

FIG. 8 is a diagram illustrating temperatures at a plurality of measurement points when the structure according to the present embodiment and the structure according to the comparative example are welded.

DETAILED DESCRIPTION

Hereinafter, embodiments of the present disclosure will be described. Each embodiment described below illustrates an aspect of the present disclosure and is not intended to limit the disclosure. Each embodiment described below can be arbitrarily changed within the scope of the technical idea of the present disclosure.

First Embodiment

Figure 1:
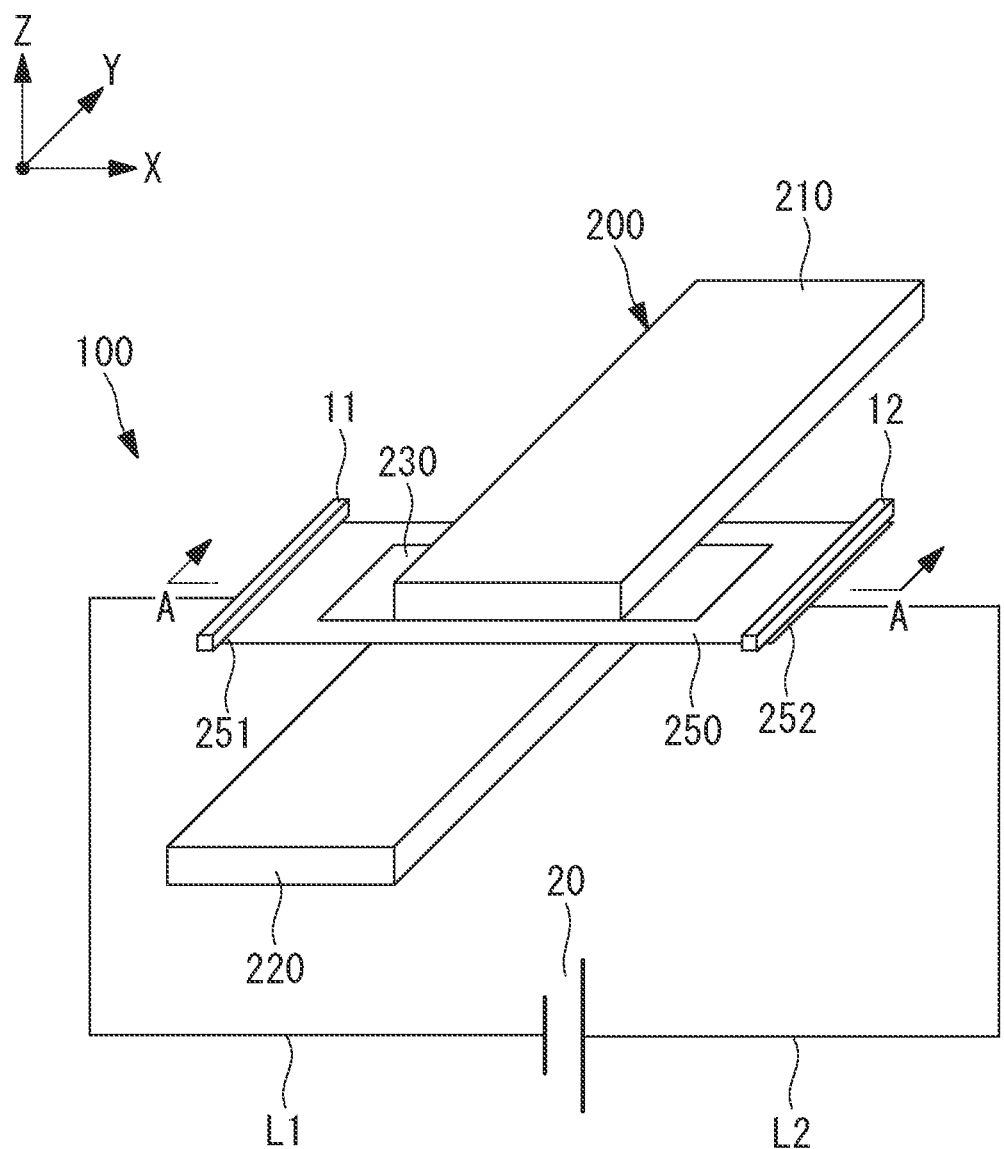
FIG. 1 is a perspective view illustrating a welding apparatus and a structure according to a first embodiment of the present disclosure.

Hereinafter, a welding apparatus 100, a welding method using the welding apparatus 100, and a structure 200 manufactured by the welding apparatus 100 according to an embodiment of the present disclosure will be described with reference to drawings. FIG. 1 is a perspective view illustrating the welding apparatus 100 and the structure 200 according to a first embodiment of the present disclosure.

Figure 2:
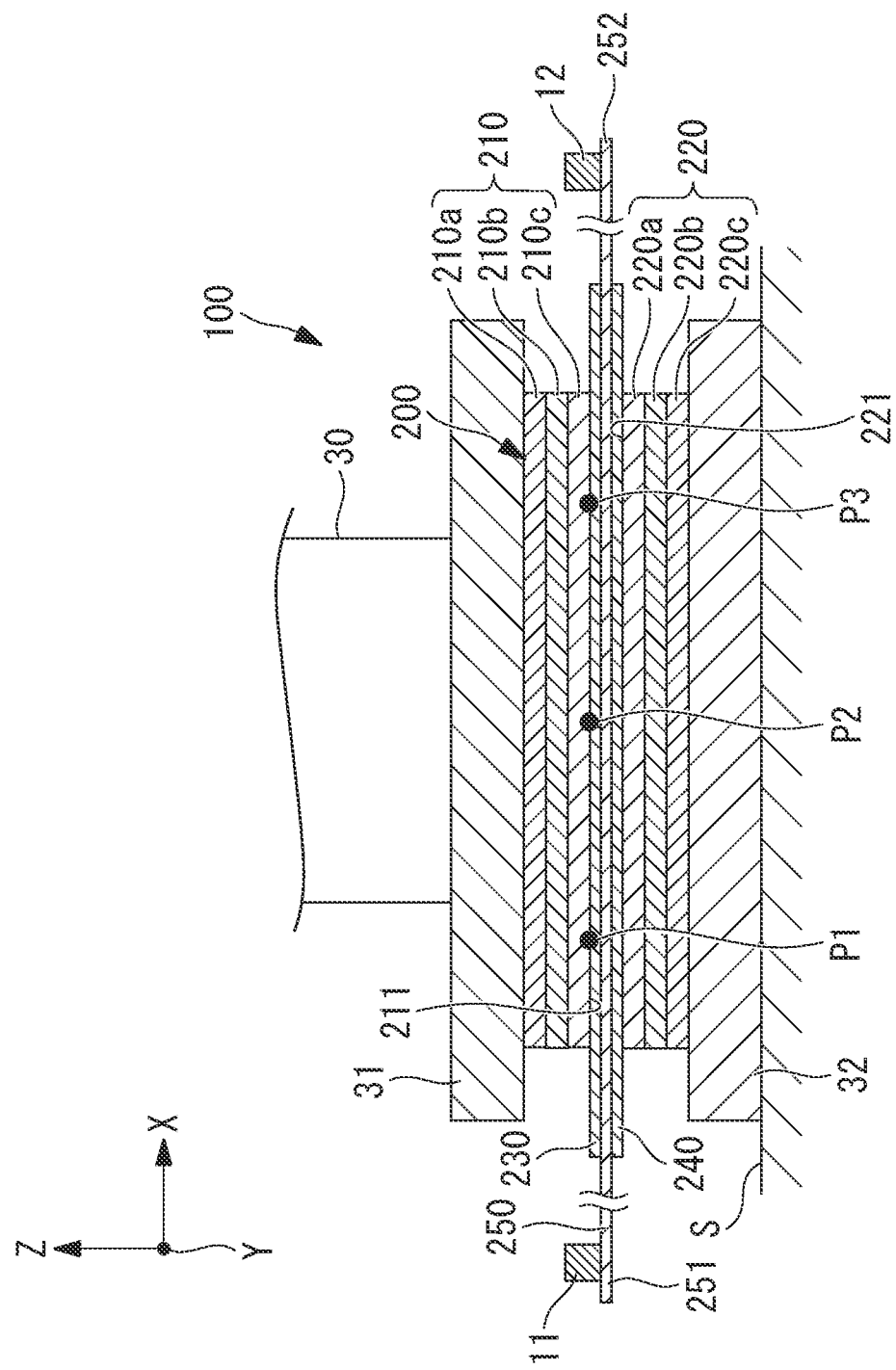
FIG. 2 is a sectional view of the welding apparatus and the structure illustrated in FIG. 1 when seen along the arrow A-A.

FIG. 2 is a sectional view of the welding apparatus 100 and the structure 200 illustrated in FIG. 1 when seen along the arrow A-A.

The welding apparatus 100 according to the present embodiment is an apparatus for manufacturing the structure 200 in which a first composite material 210 and a second composite material 220, each of which contains a carbon fiber base material and a thermoplastic resin and has conductivity, are welded. As illustrated in FIGS. 1 and 2, the welding apparatus 100 according to the present embodiment includes a first electrode portion 11, a second electrode portion 12, a power source 20, and a pressurization portion 30. The power source 20 is connected to the first electrode portion 11 via a power supply line L1 and is connected to the second electrode portion 12 via a power supply line L2.

The structure 200 according to the present embodiment is obtained by bonding the first composite material 210 and the second composite material 220 through welding. As illustrated in FIGS. 1 and 2, the structure 200 includes the first composite material 210, the second composite material 220, a first protection sheet 230, a second protection sheet 240, and an energization sheet 250.

The first composite material 210 and the second composite material 220 are members formed into plate shapes and flat shapes extending along an axial line X and an axial line Y. The first composite material 210 and the second composite material 220 illustrated in FIG. 1 are members formed into long shapes in which the lengths thereof along the axial line Y are longer than the lengths thereof along the axial line X.

Although the first composite material 210 and the second composite material 220 illustrated in FIG. 1 are assumed to be formed into flat shapes, other shapes may also be employed. For example, the first composite material 210 and the second composite material 220 may have shapes with arc-shaped sections projecting downward along an axial line Z that perpendicularly intersects the axial line Y and extends in the vertical direction. Also, the first composite material 210 and the second composite material 220 may have other arbitrary shapes.

The first composite material 210 is a laminate body formed into a plate shape by laminating three sheet-shaped composite constituents 210a, 210b, and 210c. Although the first composite material 210 in which the three composite constituents 210a, 210b, and 210c are laminated is assumed to be used in the present embodiment, a first composite material 210 in which the number of laminated layers is an arbitrary number not less than two may be employed.

The composite constituents 210a, 210b, and 210c contained in the first composite material 210 contain a carbon fiber base material with conductivity and a matrix resin (resin material). The matrix resin contained in the composite constituents 210a, 210b, and 210c is a thermoplastic resin material, and examples thereof include polyether ether ketone (PEEK), polyethylene terephthalate (PET), polybutylene terephthalate (PBT), nylon 6 (PA6), nylon 66 (PA66), polyphenylene sulfide (PPS), polyether imide (PEI), polyether ketone ketone (PEKK), and polyaryl ether ketone (PAEK).

The second composite material 220 is a laminate body formed into a plate shape by laminating three sheet-shaped composite constituents 220a, 220b, and 220c. Although the second composite material 220 in which the three composite constituents 220a, 220b, and 220c are laminated is assumed to be used in the present embodiment, a second composite material 220 in which the number of laminated layers is an arbitrary number not less than 2 may be employed.

The composite constituents 220a, 220b, and 220c contained in the second composite material 220 contain a carbon fiber base material with conductivity and a matrix resin (resin material). The matrix resin contained in the composite constituents 220a and 220b is a thermoplastic resin material. Examples of the thermoplastic resin material are similar to those of the first composite material 210.

Each of the first protection sheet 230, the second protection sheet 240, and the energization sheet 250 is formed of a single sheet material containing a carbon fiber base material oriented unidirectionally and a matrix resin (resin material). The matrix resin contained in the first protection sheet 230, the second protection sheet 240, and the energization sheet 250 is a thermoplastic resin material. Examples of the thermoplastic resin material are similar to those of the first composite material 210.

Figure 3:
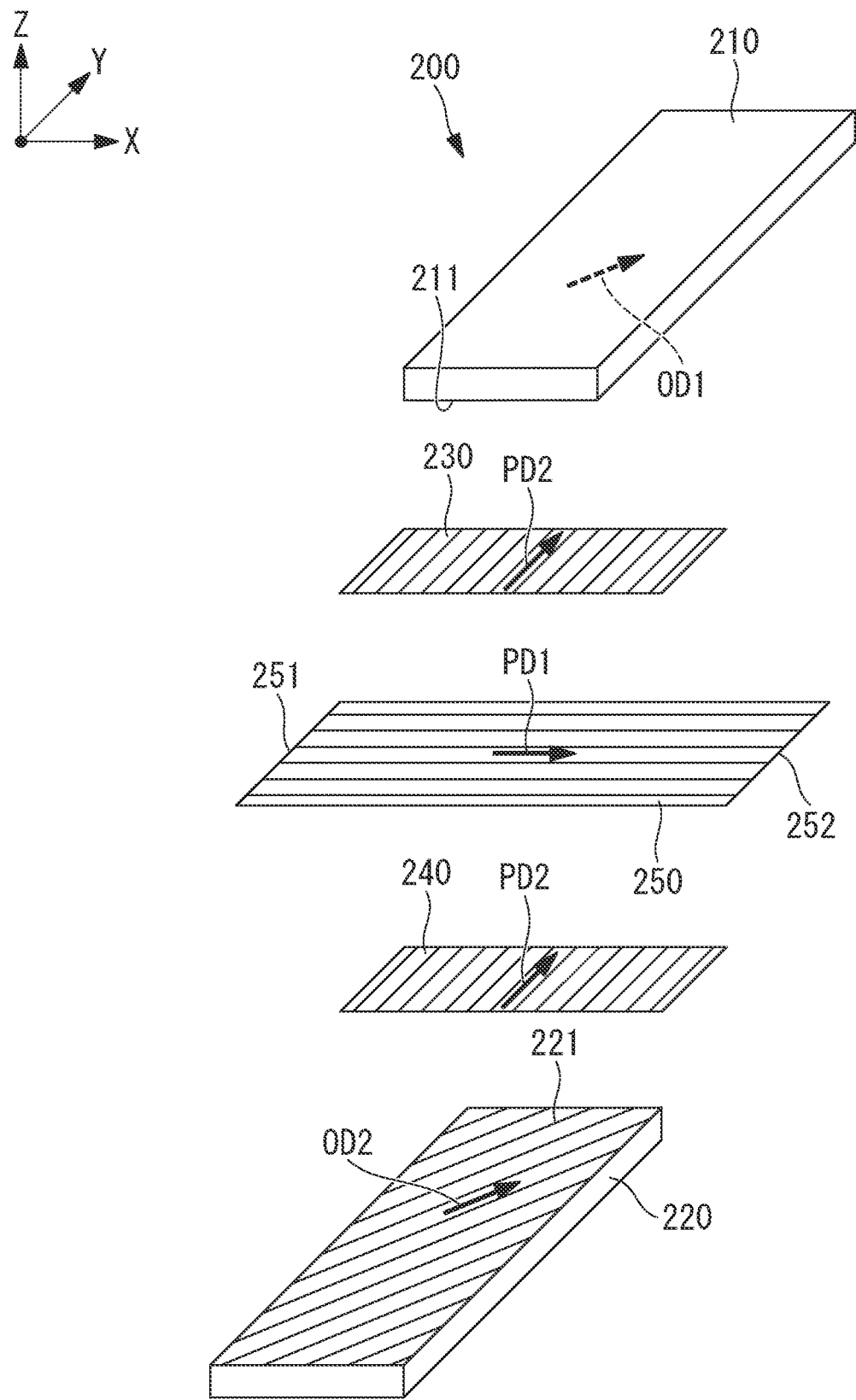
FIG. 3 is an exploded perspective view of the structure illustrated in FIG. 1.

As illustrated in FIG. 3, the first protection sheet 230 is disposed between a first bonding surface 211 of the first composite material 210 and the energization sheet 250 such that the first protection sheet 230 comes into contact with the first bonding surface 211. The second protection sheet 240 is disposed between a second bonding surface 221 of the second composite material 220 and the energization sheet 250 such that the second protection sheet 240 comes into contact with the second bonding surface 221. The energization sheet 250 is disposed such that the energization sheet 250 comes into contact with the first protection sheet 230 and the second protection sheet 240.

Figure 4:
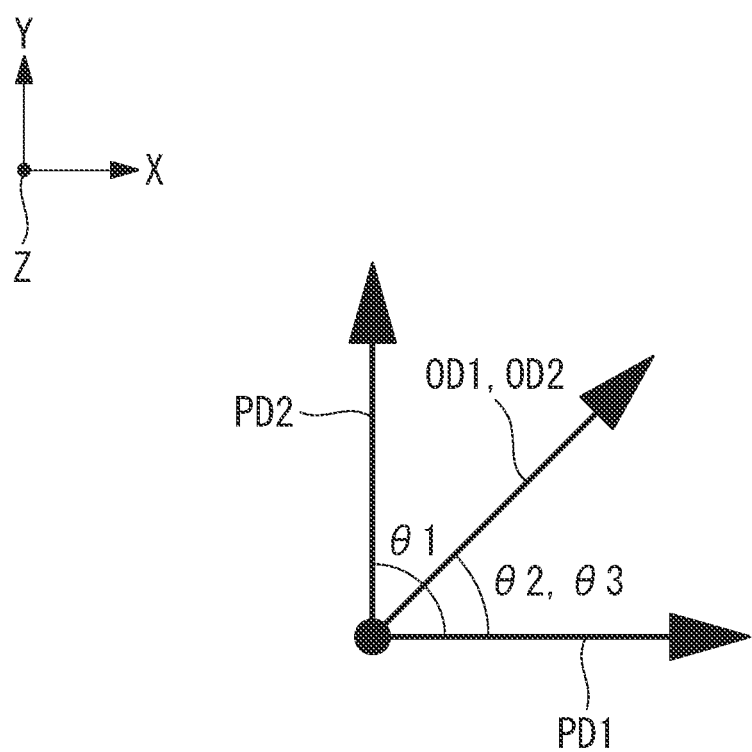
FIG. 4 is a diagram illustrating orientation directions of a carbon fiber base material.

Next, orientation directions of the carbon fiber base materials contained in the first bonding surface 211, the second bonding surface 221, the first protection sheet 230, the second protection sheet 240, and the energization sheet 250 will be described with reference to drawings. FIG. 3 is an exploded perspective view of the structure 200 illustrated in FIG. 1. FIG. 4 is a diagram illustrating orientation directions of the carbon fiber base materials.

As illustrated in FIG. 3, the energization sheet 250 contains a carbon fiber base material oriented only in a first predetermined direction PD1 connecting an end portion 251 and an end portion 252 along the axial line X. Each of the first protection sheet 230 and the second protection sheet 240 contains the carbon fiber base material oriented in a second predetermined direction PD2. The first bonding surface 211 of the first composite material 210 contains the carbon fiber base material oriented in a first orientation direction OD1. The second bonding surface 221 of the second composite material 220 contains the carbon fiber base material oriented in a second orientation direction OD2.

As illustrated in FIG. 4, an angle (first angle) formed between the first predetermined direction PD1 and the second predetermined direction PD2 in an XY plane is $\theta 1$, which is set to be an angle that is equal to or greater than 87 degrees and equal to or less than 93 degrees. $\theta$ is particularly preferably set to 90 degrees. In this manner, the second predetermined direction PD2 is a direction that substantially perpendicularly intersects the first predetermined direction PD1.

As illustrated in FIG. 4, an angle (second angle) formed by the first orientation direction OD1 of the carbon fiber base material disposed on the first bonding surface 211 with respect to the first predetermined direction PD1 in the XY plane is $\theta 2$, which is set to be an angle that is greater than 0 degrees and less than $\theta 1$.

As illustrated in FIG. 4, an angle (third angle) formed by the second orientation direction OD2 of the carbon fiber base material disposed on the second bonding surface 221 with respect to the first predetermined direction PD1 in the XY plane is $\theta 3$, which is set to be an angle that is greater than 0 degrees and less than $\theta 1$.

Although the first orientation direction OD1 is assumed to be a direction rotating from the first predetermined direction PD1 in the counterclockwise direction by $\theta 2$ in FIG. 4, the first orientation direction OD1 may be a direction rotating from the first predetermined direction PD1 in the clockwise direction by $\theta 2$. Similarly, although the second orientation direction OD2 is assumed to be a direction rotating from the first predetermined direction PD1 in the counterclockwise direction by $\theta 3$, the second orientation direction OD2 may be a direction rotating from the first predetermined direction PD1 in the clockwise direction by $\theta 3$.

A pair of electrode portions constituted by the first electrode portion 11 and the second electrode portion 12 are apparatuses that apply power to the energization sheet 250 disposed between the first composite material 210 and the second composite material 220 in a state in which the first composite material 210 and the second composite material 220 are pressurized by the pressurization portion 30. The first electrode portion 11 and the second electrode portion 12 are formed of a material with conductivity (a metal material, for example).

The first electrode portion 11 and the second electrode portion 12 are formed into bar shapes extending along the axial line Y. The first electrode portion 11 is disposed along the axial line Y such that the first electrode portion 11 comes into contact with the end portion 251 of the energization sheet. The second electrode portion 12 is disposed along the axial line Y such that the second electrode portion 12 comes into contact with the end portion 252 of the energization sheet.

The first electrode portion 11 is connected to the power source 20 via the power supply line L1, and the second electrode portion 12 is connected to the power source 20 via the power supply line L2. If a voltage is applied between the first electrode portion 11 and the second electrode portion 12 by the power source 20, then a current flows between the end portion 251 and the end portion 252 of the energization sheet 250.

The pressurization portion 30 is a mechanism that pressurizes the first composite material 210 and the second composite material 220 in a direction in which the first bonding surface 211 of the first composite material 210 and the second bonding surface 221 of the second composite material 220 are caused to approach each other. As illustrated in FIG. 2, the pressurization portion 30 pressurizes the structure 200 by pinching the structure 200 between a pressurization plate 31 and a pressurization plate 32 installed on an installation surface S and applying a bias force of approaching the pressurization plate 32 to the pressurization plate 31.

Figure 5:
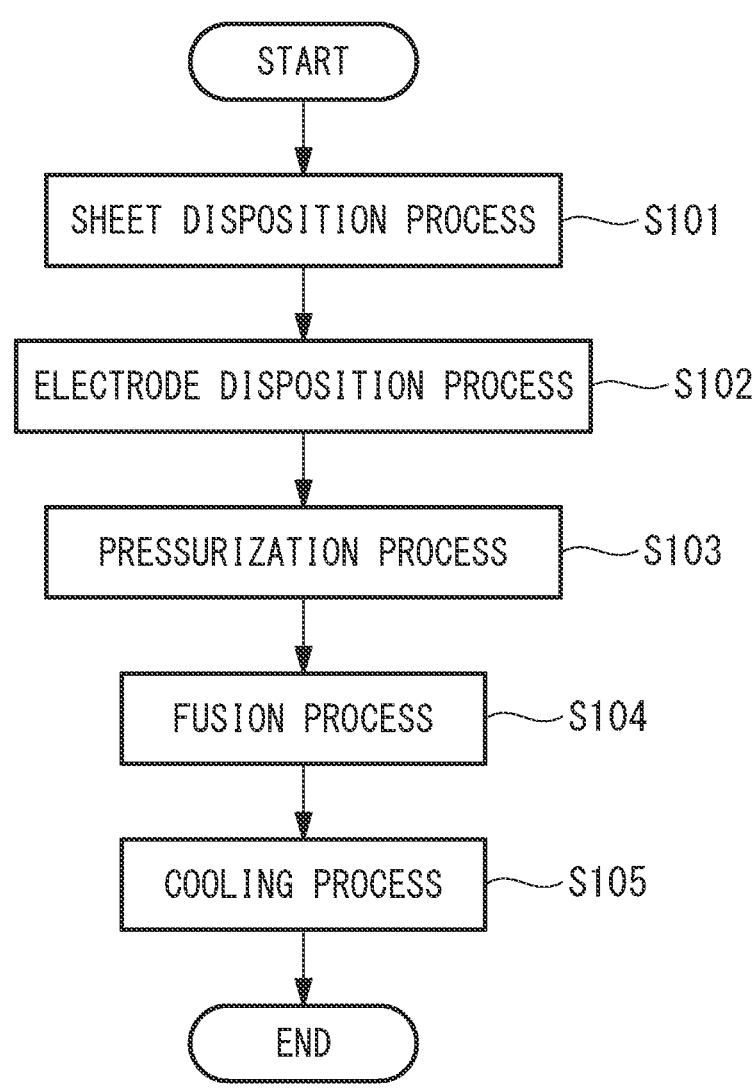
FIG. 5 is a flowchart illustrating a welding method according to the first embodiment of the present disclosure.

Next, a welding method of welding the first composite material 210 and the second composite material 220 will be described with reference to a drawing. The welding method in the present embodiment is a method of welding the first composite material 210 and the second composite material 220, each of which contains the carbon fiber base material and the thermoplastic resin. FIG. 5 is a flowchart illustrating the welding method according to the present embodiment.

As illustrated in FIG. 5, the first protection sheet 230 is disposed such that the first protection sheet 230 comes into contact with the first bonding surface 211 of the first composite material 210, the second protection sheet 240 is disposed such that the second protection sheet 240 comes into contact with the second bonding surface 221 of the second composite material 220, and the energization sheet 250 is disposed such that the energization sheet 250 comes into contact with the first protection sheet 230 and the second protection sheet 240 in Step S101 (sheet disposition process).

In Step S102 (electrode disposition process), the first electrode portion 11 is disposed such that the first electrode portion 11 comes into contact with the end portion 251 of the energization sheet 250, and the second electrode portion 12 is disposed such that the second electrode portion 12 comes into contact with the end portion 252 of the energization sheet 250.

In Step S103 (pressurization process), the pressurization portion 30 pressurizes the first composite material 210 and the second composite material 220 in a direction in which the first bonding surface 211 of the first composite material 210 and the second bonding surface 221 of the second composite material 220 are caused to approach with each other. The pressurization portion 30 applies, to the upper surface of the pressurization plate 32, a bias force of pressing it downward toward the pressurization plate 31 and pressurizes the first composite material 210 and the second composite material 220.

In Step S104 (welding process), a voltage is applied between the first electrode portion 11 and the second electrode portion 12 in a state in which the first composite material 210 and the second composite material 220 are pressurized in the pressurization process. If the voltage is applied between the first electrode portion 11 and the second electrode portion 12, then a current flows through the energization sheet 250, and the energization sheet 250 generates heat. If the matrix resin contained in the energization sheet 250 reaches a temperature that is equal to or greater than a melting point, and the matrix resin contained in the first protection sheet 230 and the second protection sheet 240 reaches a temperature that is equal to or greater than a melting point, the energization sheet 250, the first protection sheet 230, and the second protection sheet 240 are bonded.

Also, if the first bonding surface 211 of the first composite material 210 is heated via the first protection sheet 230, and the matrix resin contained in the first bonding surface 211 reaches a temperature that is equal to or greater than a melting point, the first protection sheet 230 and the first bonding surface 211 are bonded. Moreover, if the second bonding surface 221 of the second composite material 220 is heated via the second protection sheet 240, and the matrix resin contained in the second bonding surface 221 reaches a temperature that is equal to or greater than a melting point, the second protection sheet 240 and the second bonding surface 221 are bonded.

As described above, the energization sheet 250 is bonded to the first protection sheet 230 and the second protection sheet 240, the first protection sheet 230 is bonded to the first composite material 210, and the second protection sheet 240 is bonded to the second composite material 220. Then, the first bonding surface 211 of the first composite material 210 and the second bonding surface 221 of the second composite material 220 are brought into a state in which they are integrally bonded via the first protection sheet 230, the second protection sheet 240, and the energization sheet 250. In the welding process, the first composite material 210 and the second composite material 220 are welded in this manner.

In Step S105 (cooling process), a state in which the current does not flow through the energization sheet 250 via the first electrode portion 11 and the second electrode portion 12 is achieved in a state in which the first composite material 210 and the second composite material 220 are pressurized by the pressurization portion 30. For example, power supply from the power source 20 is stopped. Alternatively, the first electrode portion 11 and the second electrode portion 12 are detached from the energization sheet 250, for example. Then, a decrease in temperature of the matrix resin, which is contained in the first composite material 210, the second composite material 220, the first protection sheet 230, the second protection sheet 240, and the energization sheet 250, to a temperature that is sufficiently lower than the melting point is waited.

In a case in which the matrix resin contained in the structure 200 is cooled to a temperature that is sufficiently lower than the melting point, then the pressurization performed by the pressurization portion 30 is stopped. Thereafter, the pressurization plate 32 disposed above the structure 200 is detached, and the structure 200 disposed below it is taken out. The processes of the welding method in the present embodiment end in this manner.

Note that although the pressurization of the first composite material 210 and the second composite material 220 is started by the pressurization portion 30 in Step S103 (pressurization process) and Step S104 (welding process) is executed in the pressurized state in the aforementioned welding method, another aspect may be employed. For example, the pressurization of the first composite material 210 and the second composite material 220 may be started by the pressurization portion 30 at a timing when the state in which the current does not flow through the energization sheet 250 is achieved in Step S105 (cooling process).

Figure 6:
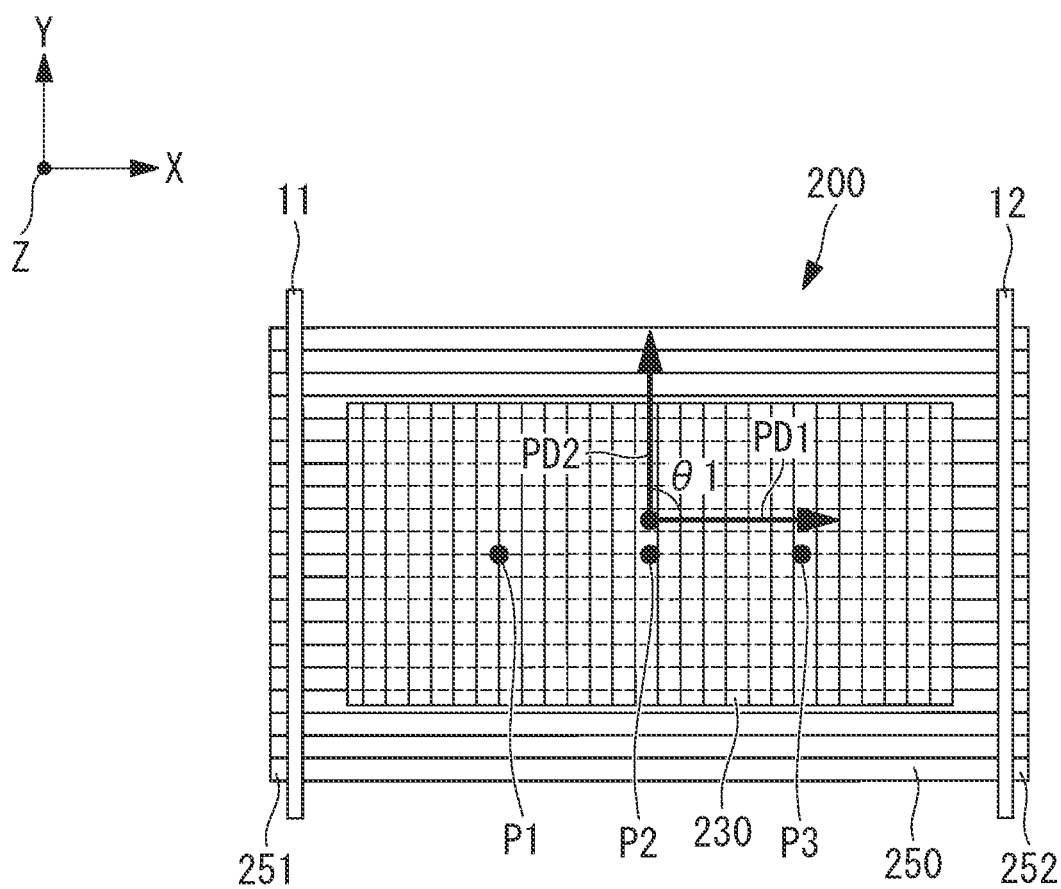
FIG. 6 is a plan view of an energization sheet and a first protection sheet illustrated in FIG. 2 when seen from the upper side.
Figure 7:
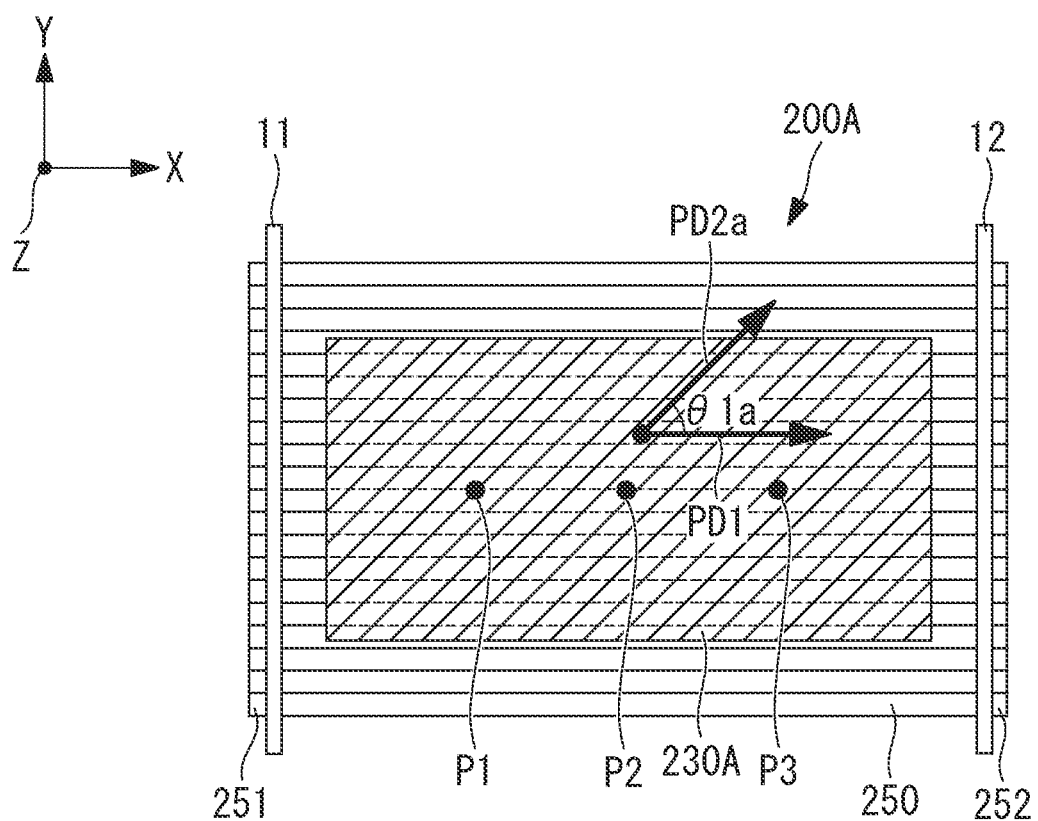
FIG. 7 is a plan view of an energization sheet and a first protection sheet in a comparative example when seen from the upper side.

Here, a difference between the welding method in the present embodiment and a welding method in a comparative example will be described with reference to FIGS. 6 to 8. FIG. 6 is a plan view of the energization sheet 250 and the first protection sheet 230 illustrated in FIG. 2 when seen from the upper side. FIG. 7 is a plan view of an energization sheet 250 and a first protection sheet 230A in the comparative example when seen from the upper side. FIG. 8 is a diagram illustrating temperatures at a plurality of measurement points when the structure 200 in the present embodiment and a structure 200A in the comparative example are welded.

As illustrated in FIG. 6, the carbon fiber base material of the first protection sheet 230 disposed between the energization sheet 250 and the first bonding surface 211 of the first composite material 210 is oriented in the second predetermined direction PD2 in the structure 200 used in the welding method in the present embodiment. The second predetermined direction PD2 is a direction that substantially perpendicularly intersects the first predetermined direction PD1. On the other hand, although the structure 200 used in the welding method in the comparative example has the same energization sheet 250 as that in the present embodiment, the carbon fiber base material of the first protection sheet 230A is oriented in a predetermined direction PD2a. An angle θ1a formed between the first predetermined direction PD1 and the predetermined direction PD2a is about 45 degrees.

Here, when the structure 200 was heated until the temperatures of the matrix resin became equal to or greater than 310° C., which was equal to or greater than the melting point, at all the measurement points P1, P2, and P3 in FIG. 2 by the welding method in the present embodiment, the results illustrated in FIG. 8 were obtained. As illustrated in FIG. 8, the temperature at the measurement point P1 reached 344° C., and the maximum temperature difference at the measurement points P1, P2, and P3 was 33° C. when the temperature at the measurement point P2 reached 311° C. in the welding method in the comparative example (the welding method using the structure 200A illustrated in FIG. 7).

On the other hand, although the temperature at the measurement point P3 reached 317° C. when the temperature at the measurement point P1 reached 310° C. in the welding method in the present embodiment (the welding method using the structure 200 illustrated in FIG. 6), the maximum temperature difference at the measurement points P1, P2, and P3 was 7° C., as illustrated in FIG. 8. As described above, it is possible to further reduce the maximum temperature difference at the measurement points P1, P2, and P3 in the welding method in the present embodiment than in the welding method in the comparative example when the heating is performed such that the temperature of the matrix resin becomes equal to or greater than the melting point at all the measurement points P1, P2, and P3.

As illustrated in FIGS. 6 and 7, the positions of the measurement points P1, P2, and P3 in the width direction (the direction that perpendicularly intersects the first predetermined direction PD1 in the XY plane) are the same. The reason that the maximum temperature difference at the measurement points P1, P2, and P3 in the welding method in the comparative example is greater than the maximum temperature difference at the measurement points P1, P2, and P3 in the welding method in the present embodiment is considered to be because a path of a current flowing in the predetermined direction PD2a is formed by the carbon fiber base material contained in the first protection sheet 230A in the comparative example and differences occur in magnitudes of the current flowing through the measurement points P1, P2, and P3.

Effects and advantages of the welding method in the present embodiment described above will be described.

According to the welding method in the present embodiment, the first protection sheet 230 is disposed such that the first protection sheet 230 comes into contact with the first bonding surface 211 of the first composite material 210, the second protection sheet 240 is disposed such that the second protection sheet 240 comes into contact with the second bonding surface 221 of the second composite material 220, and the energization sheet 250 is disposed such that the energization sheet 250 comes into contact with the first protection sheet 230 and the second protection sheet 240 in the sheet disposition process (S101). In the welding process (S104), a voltage is applied to the pair of electrode portions 11 and 12 that are in contact with the pair of end portions 251 and 252 of the energization sheet 250 in a state in which the first composite material 210 and the second composite material 220 are pressurized, and a current thereby flows through the carbon fiber base material contained in the energization sheet 250.

Since the first protection sheet 230 is disposed between the energization sheet 250 and the first composite material 210, and the second protection sheet 240 is disposed between the energization sheet 250 and the second composite material 220, the current flowing through the energization sheet 250 flows through the carbon fiber base material disposed in the first bonding surface 211 and the second bonding surface 221, and it is thus possible to prevent the first bonding surface 211 and the second bonding surface 221 from locally and excessively generating heat.

Also, the carbon fiber base material contained in the energization sheet 250 is oriented in the first predetermined direction PD1 connecting the pair of electrode portions 11 and 12, and the carbon fiber base material contained in the first protection sheet 230 and the second protection sheet 240 is oriented in the second predetermined direction PD2 that substantially perpendicularly intersects the first predetermined direction PD1. Therefore, as compared with the case in which the carbon fiber base material contained in the first protection sheet 230 and the second protection sheet 240 is oriented in another direction that is different from the second predetermined direction PD2, localization of temperature distribution in the bonding region where the first composite material 210 and the second composite material 220 come into contact with each other is curbed, and it is possible to appropriately weld the first composite material 210 and the second composite material 220 in the entire region of the bonding region where the first composite material 210 and the second composite material 220 come into contact with each other.

The reason that the localization of temperature distribution in the bonding region is curbed by orienting the carbon fiber base material contained in the first protection sheet 230 and the second protection sheet 240 in the second predetermined direction PD2 is because the carbon fiber base material is oriented in the direction that substantially perpendicularly intersects the current energization direction in the energization sheet 250, the current flowing through the carbon fiber base material contained in the first protection sheet 230 and the second protection sheet 240 hardly moves in the energization direction, and a region where a current is likely to flow does not occur locally.

Also, a state in which the carbon fiber base material contained in the energization sheet and oriented in the first predetermined direction PD1 is energized is achieved at a plurality of positions in the energization sheet 250 in the current energization direction by orienting the carbon fiber base material contained in the first protection sheet 230 and the second protection sheet 240 in the second predetermined direction PD2. In this manner, the voltage difference at each position of the carbon fiber base material contained in the energization sheet 250 in the second predetermined direction PD2 is curbed at a plurality of positions in the energization sheet 250 in the current energization direction, and it is possible to curb localization of temperature distribution caused by the voltage difference.

Also, according to the welding method in the present embodiment, the localization of temperature distribution in the bonding region where the first composite material 210 and the second composite material 220 come into contact with each other is curbed, and it is possible to appropriately weld the first composite material 210 and the second composite material 220 in the entire region of the bonding region where the first composite material 210 and the second composite material 220 come into contact with each other, by setting the angle θ1 formed by the second predetermined direction PD2 with respect to the first predetermined direction P1 to be equal to or greater than 87 degrees and equal to or less than 93 degrees.

Also, according to the welding method in the present embodiment, it is possible to enhance the strength of the first bonding surface 211 by setting the angle θ2 formed by the first orientation direction OD1 of the carbon fiber base material disposed on the first bonding surface 211 of the first composite material 210 extending in the second predetermined direction PD2 with respect to the first predetermined direction PD1 to be greater than zero and less than the angle θ1. Similarly, it is possible to enhance the strength of the second bonding surface 221 by setting the angle θ3 formed by the second orientation direction OD2 of the carbon fiber base material disposed on the second bonding surface 221 of the second composite material 220 extending in the second predetermined direction PD2 with respect to the first predetermined direction PD1 to be greater than zero and less than the angle θ1.

Also, according to the welding method in the present embodiment, it is possible to minimize members used to bond the first bonding surface 211 of the first composite material 210 to the second bonding surface 221 of the second composite material 220 and to obtain the structure 200 with a desired shape as a final product, by forming each of the first protection sheet 230, the second protection sheet 240, and the energization sheet 250 using a single sheet material.

Second Embodiment

Next, a welding method according to a second embodiment of the present disclosure will be described. The present embodiment is a modification of the first embodiment, and description will be omitted below on the assumption that the present embodiment is similar to the first embodiment other than the particular cases described below.

In the welding method in the first embodiment, the first protection sheet 230, the second protection sheet 240, and the energization sheet 250 are not bonded to any of the first composite material 210 and the second composite material 220 in advance when they are disposed between the first composite material 210 and the second composite material 220.

On the other hand, in the present embodiment, a first protection sheet 230B, a second protection sheet 240B, and an energization sheet 250B are bonded to a second composite material 220B in advance, a first composite material 210B is then disposed, and a current is caused to flow through the energization sheet 250B.

Figure 9:
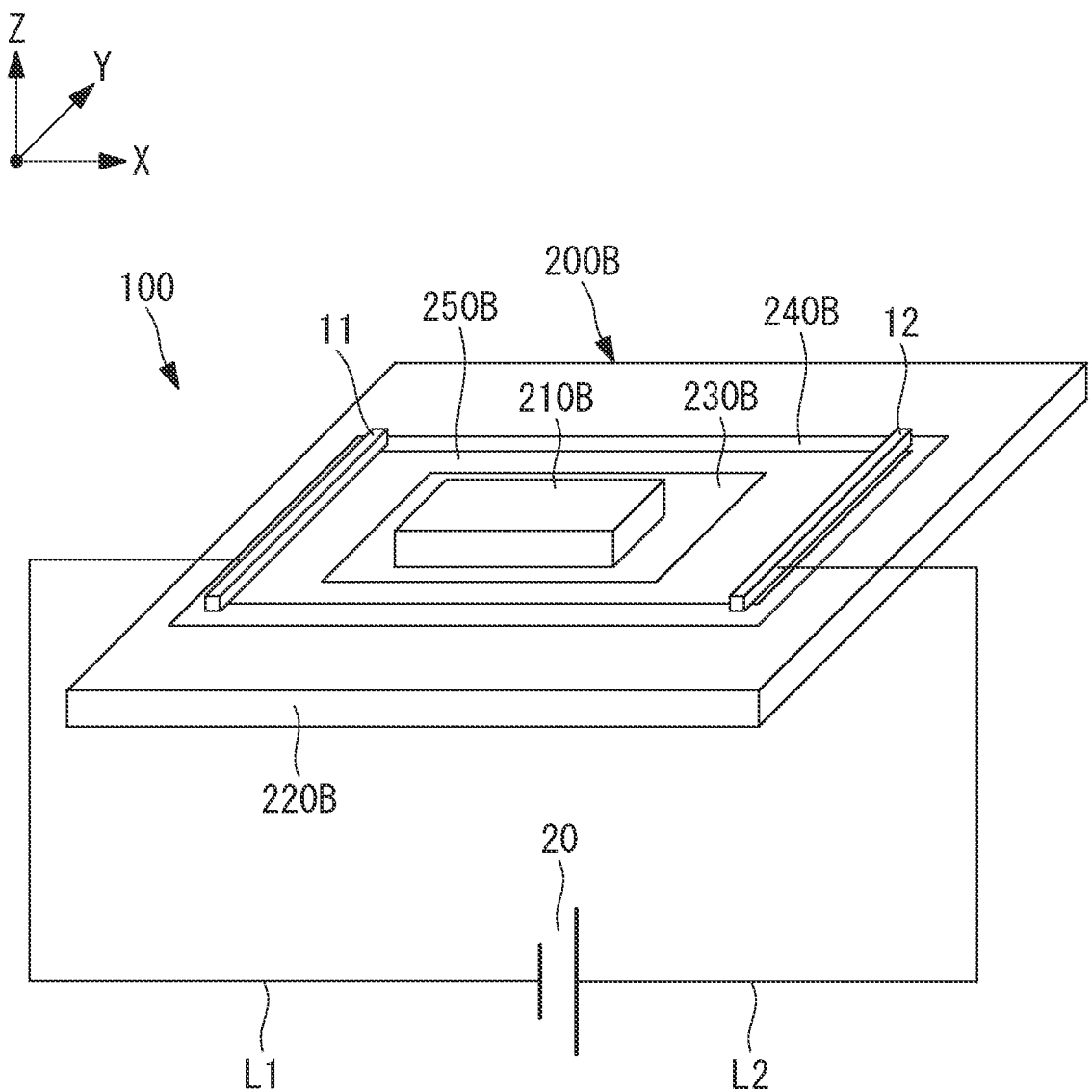
FIG. 9 is a perspective view illustrating a welding apparatus and a structure according to a second embodiment of the present disclosure.
Figure 10:
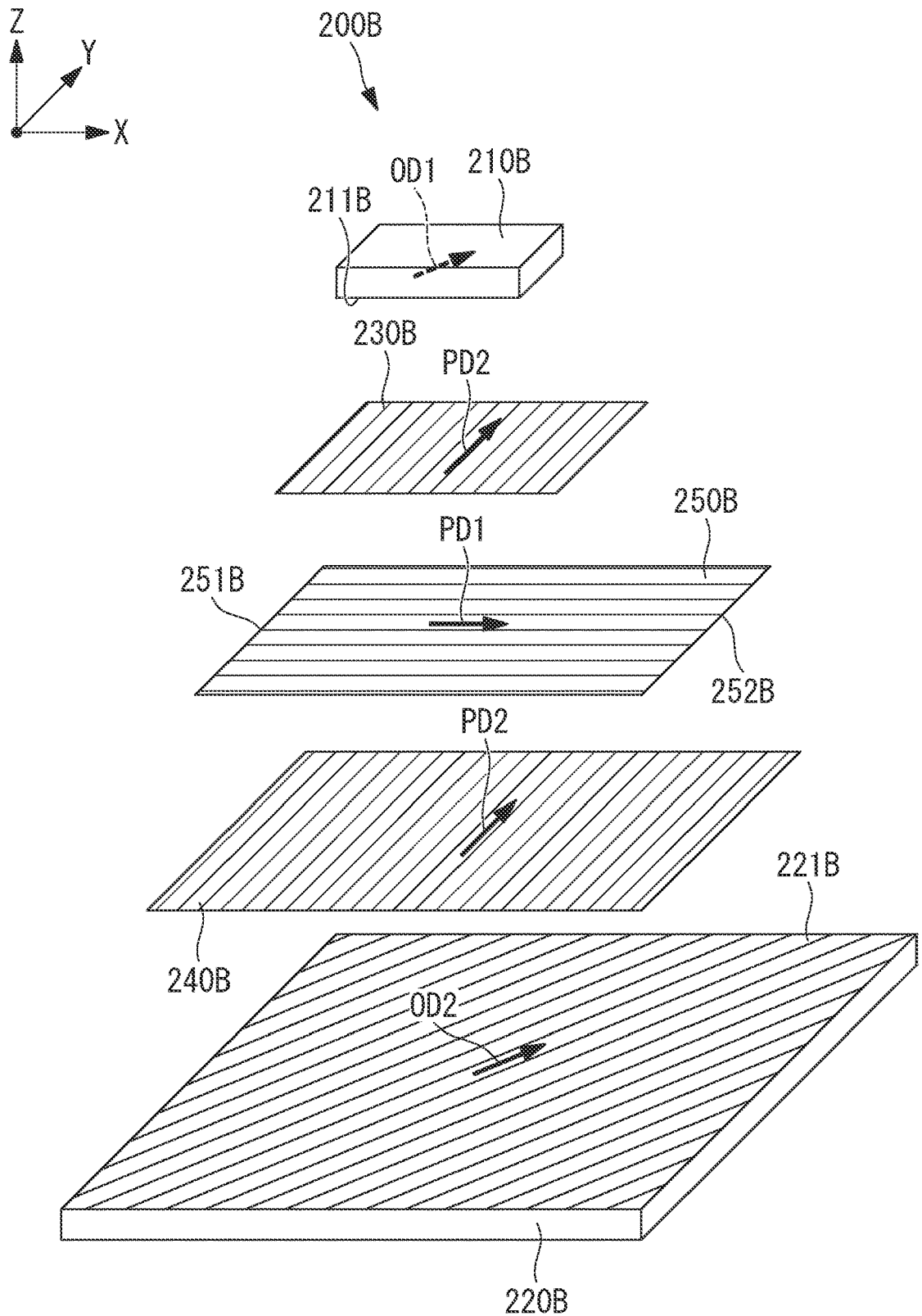
FIG. 10 is an exploded perspective view of the structure illustrated in FIG. 9.

A structure 200B in the present embodiment is obtained by bonding the first composite material 210B and the second composite material 220B through welding. As illustrated in FIGS. 9 and 10, the structure 200 includes the first composite material 210B, the second composite material 220B, the first protection sheet 230B, the second protection sheet 240B, and the energization sheet 250B.

The first composite material 210B and the second composite material 220B are members formed into a plate shape and a flat shape extending along the axial line X and the axial line Y. As illustrated in FIG. 9, the first composite material 210B has a length along the axial line X and a length along the axial line Y, both of which are longer than those of the second composite material 220B. The second composite material 220B has a length along the axial line X and a length along the axial line Y, both of which are shorter than those of the first composite material 210B.

Although the first composite material 210B and the second composite material 220B illustrated in FIG. 9 are assumed to be formed into flat shapes, other shapes may also be employed. For example, the first composite material 210B and the second composite material 220B may have shapes with arc-shaped sections projecting downward along the axial line Z that perpendicularly intersects the axial line Y and extends in the vertical direction. Alternatively, the first composite material 210B and the second composite material 220B may have other arbitrary shapes.

Figure 11:
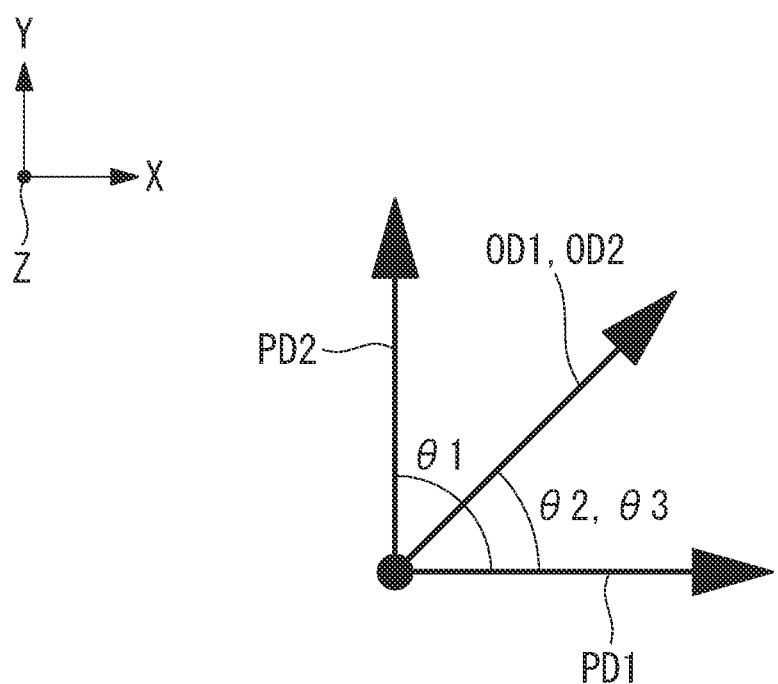
FIG. 11 is a diagram illustrating orientation directions of a carbon fiber base material.
Figure 12:
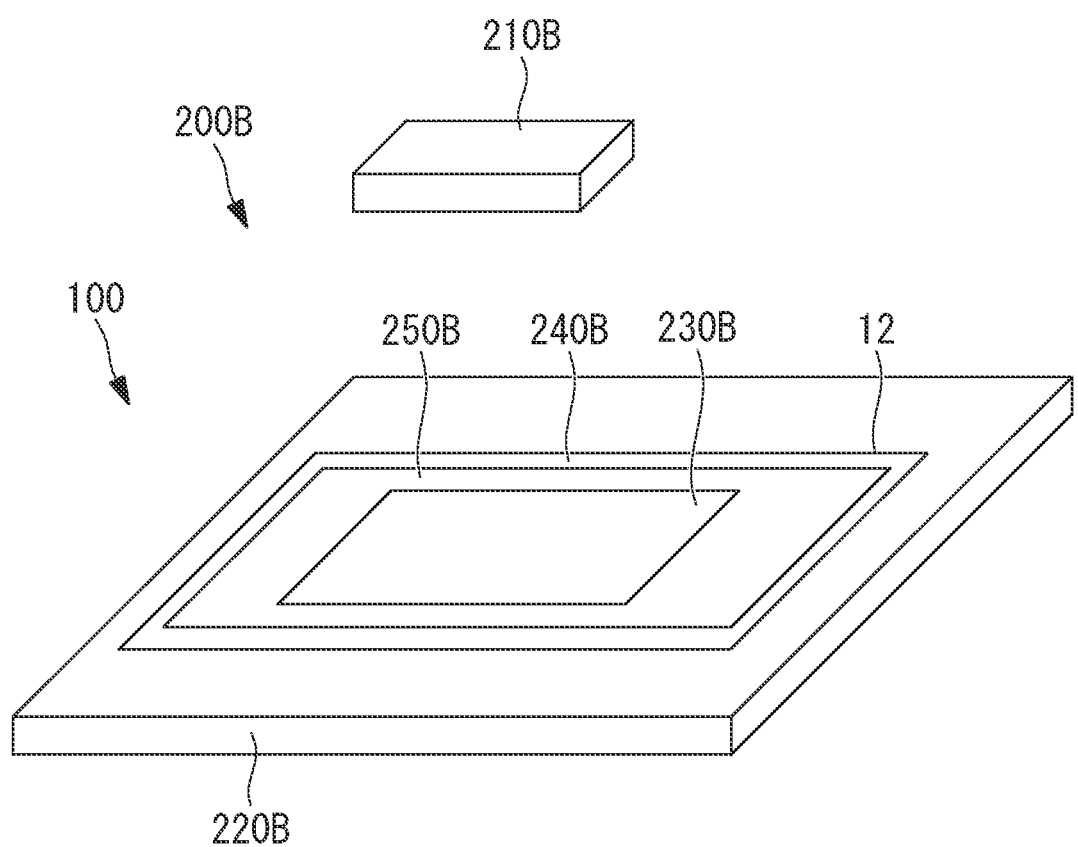
FIG. 12 is a perspective view illustrating a state in which a first protection sheet, a second protection sheet, and an energization sheet are bonded to a second composite material.

Next, orientation directions of the carbon fiber base material contained in a first bonding surface 211B, a second bonding surface 221B, the first protection sheet 230B, the second protection sheet 240B, and the energization sheet 250B will be described with reference to the drawings. FIG. 10 is an exploded perspective view of the structure 200B illustrated in FIG. 9. FIG. 11 is a diagram illustrating orientation directions of the carbon fiber base material. FIG. 12 is a perspective view illustrating a state in which the first protection sheet 230B, the second protection sheet 240B, and the energization sheet 250B are bonded to the second composite material 220B.

As illustrated in FIG. 10, the energization sheet 250B contains a carbon fiber base material oriented only in a first predetermined direction PD1 connecting an end portion 251B and an end portion 252B along the axial line X. Each of the first protection sheet 230B and the second protection sheet 240B contains a carbon fiber base material oriented in a second predetermined direction PD2. The first bonding surface 211B of the first composite material 210B contains a carbon fiber base material oriented in a first orientation direction OD1. The second bonding surface 221B of the second composite material 220B contains a carbon fiber base material oriented in the second orientation direction OD2.

As illustrated in FIG. 11, an angle (first angle) formed between the first predetermined direction PD1 and the second predetermined direction PD2 in the XY plane is θ1, which is set to be equal to or greater than 87 degrees and equal to or less than 93 degrees. θ1 is particularly preferably set to 90 degrees. In this manner, the second predetermined direction PD2 is a direction that substantially perpendicularly intersects the first predetermined direction PD1.

As illustrated in FIG. 11, an angle (second angle) formed by the first orientation direction OD1 of the carbon fiber base material disposed on the first bonding surface 211B with respect to the first predetermined direction PD1 in the XY plane is θ2, which is set to be an angle that is greater than 0 degrees and less than θ1.

As illustrated in FIG. 11, an angle (third angle) formed by the second orientation direction OD2 of the carbon fiber base material disposed on the second bonding surface 221B with respect to the first predetermined direction PD1 in the XY plane is θ3, which is set to be an angle that is greater than 0 degrees and less than θ1.

Although the first orientation direction OD1 is assumed to be a direction rotating from the first predetermined direction PD1 in the counterclockwise direction by θ2 in FIG. 11, the first orientation direction OD1 may be a direction rotating from the first predetermined direction PD1 in the clockwise direction by θ2. Similarly, although the second orientation direction OD2 is assumed to be a direction rotating from the first predetermined direction PD1 in the counterclockwise direction by θ3, the second orientation direction OD2 may be a direction rotating from the first predetermined direction PD1 in the clockwise direction by θ3.

The welding method in the present embodiment is different from the welding method in the first embodiment in that the first protection sheet 230B, the second protection sheet 240B, and the energization sheet 250B are bonded to the second composite material 220B in advance. In the welding method in the present embodiment, the first protection sheet 230B, the second protection sheet 240B, and the energization sheet 250B are bonded to the second composite material 220B in advance in Step S101 (sheet disposition process) in FIG. 5.

The bonding of the first protection sheet 230B, the second protection sheet 240B, and the energization sheet 250B to the second composite material 220B is performed by heating a part or all of the first protection sheet 230B, the second protection sheet 240B, and the energization sheet 250B and heating the matrix resin contained therein to a temperature that is equal to or greater than the melting point. If the first protection sheet 230B, the second protection sheet 240B, and the energization sheet 250B are bonded to the second composite material 220B, then the state illustrated in FIG. 12 is obtained.

As a method of heating the first protection sheet 230B, the second protection sheet 240B, and the energization sheet 250B, an arbitrary method can be used. Examples thereof include a method of bringing a heated plate-shaped member (not illustrated) into contact with them, a method of irradiating them with an infrared ray or an ultrasonic wave to heat them, and a method of causing a current to flow through the carbon fiber base material contained therein through electromagnetic induction heating and thereby heating them.

After the state illustrated in FIG. 12 is obtained, the first composite material 210B to be bonded to the second composite material 220B is installed above the first protection sheet 230B, and the state illustrated in FIG. 9 is obtained. The operation of installing the first composite material 210B above the first protection sheet 230B may be performed by an operator or by a robot hand (not illustrated) gripping the first composite material 210B. After the state illustrated in FIG. 9 is obtained, each process illustrated in FIG. 5 is executed, and the first composite material 210B is welded with the second composite material 220B.

According to the welding method in the present embodiment, the operation of installing the first composite material 210 on the second composite material 220 is further facilitated by bonding the first protection sheet 230B, the second protection sheet 240B, and the energization sheet 250B to the second composite material 220B in advance, as compared with the case in which these are not bonded in advance. In other words, since the first protection sheet 230B, the second protection sheet 240B, and the energization sheet 250B are bonded to the second composite material 220B in advance, it is possible to prevent the positions of the first protection sheet 230B, the second protection sheet 240B, and the energization sheet 250B from deviating with respect to the position of the second composite material 220B when the first composite material 210 is installed on the second composite material 220.

The welding methods described in the embodiments described above can be recognized as follows, for example.

The welding method according to the present disclosure is a welding method of welding the first composite material (210) and the second composite material (220), each of which contains the carbon fiber base material and the thermoplastic resin, the method including: the sheet disposition process (S101) of disposing the first protection sheet (230) such that the first protection sheet (230) comes into contact with the first bonding surface (211) of the first composite material (210), disposing the second protection sheet (240) such that the second protection sheet (240) comes into contact with the second bonding surface (221) of the second composite material (220), and disposing the energization sheet (250) such that the energization sheet (250) comes into contact with the first protection sheet and the second protection sheet; the electrode disposition process (S102) of disposing the pair of electrode portions (11, 12) such that the electrode portions (11, 12) come into contact with the pair of end portions (251, 252) of the energization sheet; and the welding process (S104) of applying a voltage to the pair of electrode portions and welding the first composite material and the second composite material, in which each of the first protection sheet, the second protection sheet, and the energization sheet contains the carbon fiber base material oriented unidirectionally and the thermoplastic resin, the energization sheet contains the carbon fiber base material oriented in the first predetermined direction (PD1) connecting the pair of electrode portions, and the first protection sheet and the second protection sheet contain the carbon fiber base material oriented in the second predetermined direction (PD2) that substantially perpendicularly intersects the first predetermined direction.

According to the welding method of the present disclosure, the first protection sheet is disposed such that the first protection sheet comes into contact with the first bonding surface of the first composite material, the second protection sheet is disposed such that the second protection sheet comes into contact with the second bonding surface of the second composite material, and the energization sheet is disposed such that the energization sheet comes into contact with the first protection sheet and the second protection sheet in the sheet disposition process. A current flows through the carbon fiber base material contained in the energization sheet by applying the voltage to the pair of electrode portions that are in contact with the pair of end portions of the energization sheet in the welding process.

Since the first protection sheet is disposed between the energization sheet and the first composite material, and the second protection sheet is disposed between the energization sheet and the second composite material, the current flowing through the energization sheet flows through the carbon fiber base material disposed on the first bonding surface and the second bonding surface, and it is thus possible to prevent the first bonding surface and the second bonding surface from locally and excessively generating heat.

Also, the carbon fiber base material contained in the energization sheet is oriented in the first predetermined direction connecting the pair of electrode portions, and the carbon fiber base material contained in the first protection sheet and the second protection sheet is oriented in the second predetermined direction that substantially perpendicularly intersects the first predetermined direction. Therefore, it is possible to curb localization of temperature distribution in the bonding region where the first composite material and the second composite material come into contact with each other and to appropriately weld the first composite material and the second composite material in the entire region of the bonding region where the first composite material and the second composite material come into contact with each other, as compared with the case in which the carbon fiber base material contained in the first protection sheet and the second protection sheet is oriented in another direction that is different from the second predetermined direction.

The reason that the localization of temperature distribution in the bonding region is curbed by orienting the carbon fiber base material contained in the first protection sheet and the second protection sheet in the second predetermined direction is because the carbon fiber base material is oriented in the direction that substantially perpendicularly intersects the current energization direction in the energization sheet, the current flowing through the carbon fiber base material contained in the first protection sheet and the second protection sheet hardly moves in the energization direction, and a region where a current is likely to flow does not occur locally.

Also, the state in which the carbon fiber base material contained in the energization sheet and oriented in the first predetermined direction is energized is obtained at a plurality of positions in the energization sheet in the current energization direction, by orienting the carbon fiber base material contained in the first protection sheet and the second protection sheet in the second predetermined direction. In this manner, a voltage difference at each position in the carbon fiber base material contained in the energization sheet in the second predetermined direction is curbed at a plurality of positions in the energization sheet in the current energization direction, and it is possible to curb localization of temperature distribution caused by the voltage difference.

The welding method in the present disclosure preferably includes: the pressurization process (S103) of pressurizing the first composite material and the second composite material in the direction in which the first bonding surface and the second bonding surface are caused to approach each other, and the welding process is configured to apply a voltage to the pair of electrode portions and weld the first composite material and the second composite material in a state in which the first composite material and the second composite material are pressurized in the pressurization process.

According to the welding method with the configuration, the voltage is applied to the pair of electrode portions in the state in which the first composite material and the second composite material are pressurized, it is possible to weld the first composite material and the second composite material while preventing the first composite material and the second composite material from being deformed due to influences of heat.

The welding method in the present disclosure is preferably configured such that the first angle (θ1) formed by the second predetermined direction with respect to the first predetermined direction is equal to or greater than 87 degrees and equal to or less than 93 degrees.

According to the welding method with the configuration, it is possible to curb localization of temperature distribution in the bonding region where the first composite material and the second composite material come into contact with each other and to appropriately weld the first composite material and the second composite material in the entire region of the bonding region where the first composite material and the second composite material come into contact with each other, by setting the first angle formed by the second predetermined direction with respect to the first predetermined direction to be equal to or greater than 87 degrees and equal to or less than 93 degrees.

The welding method in the present disclosure is preferably configured such that the first composite material and the second composite material are members extending in the second predetermined direction, and the second angle (θ2) formed by the first orientation direction of the carbon fiber base material disposed on the first bonding surface with respect to the first predetermined direction and the third angle (θ3) formed by the second orientation direction of the carbon fiber base material disposed on the second bonding surface with respect to the first predetermined direction are greater than zero and less than the first angle.

According to the welding method with the configuration, it is possible to enhance the strength of the first bonding surface by setting the second angle formed by the first orientation direction of the carbon fiber base material disposed on the first bonding surface of the first composite material extending in the second predetermined direction with respect to the first predetermined direction to be greater than zero and less than the first angle. Similarly, it is possible to enhance the strength of the second bonding surface by setting the third angle formed by the second orientation direction of the carbon fiber base material disposed on the second bonding surface of the second composite material extending in the second predetermined direction with respect to the first predetermined direction to be greater than zero and less than the first angle.

The welding method in the present disclosure is preferably configured such that each of the first composite material and the second composite material is formed by laminating a plurality of sheet materials containing the carbon fiber base material and the thermoplastic resin, and each of the first protection sheet, the second protection sheet, and the energization sheet is formed of a single sheet material containing the carbon fiber base material and the thermoplastic resin.

It is possible to minimize the members used to bond the first bonding surface of the first composite material and the second bonding surface of the second composite material and to obtain a structure with a desired shape as a final product, by forming each of the first protection sheet, the second protection sheet, and the energization sheet using a single sheet material.

The structure described in the embodiments described above can be recognized as follows, for example.

The structure according to the present disclosure is a structure in which the first composite material and the second composite material are welded, each of the first composite material and the second composite material containing the carbon fiber base material and the thermoplastic resin, the structure including: the first composite material; the second composite material; the first protection sheet disposed such that the first protection sheet comes into contact with the first bonding surface of the first composite material; the second protection sheet disposed such that the second protection sheet comes into contact with the second bonding surface of the second composite material; and the energization sheet disposed such that the energization sheet comes into contact with the first protection sheet and the second protection sheet, in which each of the first protection sheet, the second protection sheet, and the energization sheet contains the carbon fiber base material oriented unidirectionally and the thermoplastic resin, the energization sheet contains the carbon fiber base material oriented in the first predetermined direction connecting the pair of end portions, and the first protection sheet and the second protection sheet contain the carbon fiber base material oriented in the second predetermined direction that substantially perpendicularly intersects the first predetermined direction.

According to the structure in the present disclosure, the first protection sheet is disposed such that the first protection sheet comes into contact with the first bonding surface of the first composite material, the second protection sheet is disposed such that the second protection sheet comes into contact with the second bonding surface of the second composite material, and the energization sheet is disposed such that the energization sheet comes into contact with the first protection sheet and the second protection sheet. A current flows through the carbon fiber base material contained in the energization sheet by applying the voltage with the pair of electrode portions brought into contact with the pair of end portions of the energization sheet in a state in which the first composite material and the second composite material are pressurized.

Since the first protection sheet is disposed between the energization sheet and the first composite material, and the second protection sheet is disposed between the energization sheet and the second composite material, the current flowing through the energization sheet flows through the carbon fiber base material disposed on the first bonding surface and the second bonding surface, and it is thus possible to prevent the first bonding surface and the second bonding surface from locally and excessively generating heat.

Also, the carbon fiber base material contained in the energization sheet is oriented in the first predetermined direction connecting the pair of electrode portions, and the carbon fiber base material contained in the first protection sheet and the second protection sheet is oriented in the second predetermined direction that substantially perpendicularly intersects the first predetermined direction. Therefore, it is possible to curb localization of temperature distribution in the bonding region where the first composite material and the second composite material come into contact with each other and to appropriately weld the first composite material and the second composite material in the entire region of the bonding region where the first composite material and the second composite material come into contact with each other, as compared with the case in which the carbon fiber base material contained in the first protection sheet and the second protection sheet is oriented in another direction that is different from the second predetermined direction.

The reason that the localization of temperature distribution in the bonding region is curbed by orienting the carbon fiber base material contained in the first protection sheet and the second protection sheet in the second predetermined direction is because the carbon fiber base material is oriented in the direction that substantially perpendicularly intersects the current energization direction in the energization sheet, the current flowing through the carbon fiber base material contained in the first protection sheet and the second protection sheet hardly moves in the energization direction, and a region where a current is likely to flow does not occur locally.

A state in which the carbon fiber base material contained in the energization sheet and oriented in the first direction is energized is obtained at a plurality of positions in the energization sheet in the current energization direction by orienting the carbon fiber base material contained in the first protection sheet and the second protection sheet in the second predetermined direction. In this manner, a voltage difference at each position in the carbon fiber base material contained in the energization sheet in the second predetermined direction is curbed at a plurality of positions in the energization sheet in the current energization direction, and it is possible to curb localization of temperature distribution caused by the pressure difference.

The structure in the present disclosure is preferably configured such that each of the first composite material and the second composite material is formed by laminating a plurality of sheet materials containing the carbon fiber base material and the thermoplastic resin, and each of the first protection sheet, the second protection sheet, and the energization sheet is formed of a single sheet material containing the carbon fiber base material and the thermoplastic resin.

It is possible to minimize the members used to bond the first bonding surface of the first composite material and the second bonding surface of the second composite material and to obtain a structure with a desired shape as a final product, by forming each of the first protection sheet, the second protection sheet, and the energization sheet using the single sheet material.

What is claimed is:

1. A welding method of welding a first composite material and a second composite material, each of which contains a carbon fiber base material and a thermoplastic resin, the method comprising:
   a sheet disposition process of disposing a first protection sheet such that the first protection sheet comes into contact with a first bonding surface of the first composite material, disposing a second protection sheet such that the second protection sheet comes into contact with a second bonding surface of the second composite material, and disposing an energization sheet such that the energization sheet comes into contact with the first protection sheet and the second protection sheet;
   an electrode disposition process of disposing a pair of electrode portions such that the electrode portions come into contact with a pair of end portions of the energization sheet; and
   a welding process of applying a voltage to the pair of electrode portions and welding the first composite material and the second composite material,
   wherein each of the first protection sheet, the second protection sheet, and the energization sheet contains the carbon fiber base material oriented unidirectionally and the thermoplastic resin,
   the energization sheet contains only the carbon fiber base material oriented in a first predetermined direction connecting the pair of electrode portions,
   the first protection sheet and the second protection sheet contain only the carbon fiber base material oriented in a second predetermined direction that substantially perpendicularly intersects the first predetermined direction,
   the first protection sheet is disposed to be in direct contact with a first surface of the energization sheet, and
   the second protection sheet is disposed to be in direct contact with a second surface of the energization sheet,
   in the sheet deposition process, the first composite material is installed above the first protection sheet after bonding the first protection sheet, the second protection sheet, and the energization sheet to the second composite material by heating a part or all of the first protection sheet, the second protection sheet, and the energization sheet and heating the matrix resin contained therein to a temperature that is equal to or greater than the melting point.

2. The welding method according to claim 1, further comprising:
   a pressurization process of pressurizing the first composite material and the second composite material in a direction in which the first bonding surface and the second bonding surface are caused to approach each other,
   wherein in the welding process, the voltage is applied to the pair of electrode portions in a state in which the first composite material and the second composite material are pressurized in the pressurization process, and the first composite material and the second composite material are thereby welded.

3. The welding method according to claim 1, wherein a first angle formed by the second predetermined direction with respect to the first predetermined direction is equal to or greater than 87 degrees and equal to or less than 93 degrees.

4. The welding method according to claim 3,
   wherein the first composite material and the second composite material are members extending in the second predetermined direction, and
   a second angle formed by a first orientation direction of the carbon fiber base material disposed on the first bonding surface with respect to the first predetermined direction and a third angle formed by a second orientation direction of the carbon fiber base material disposed on the second bonding surface with respect to the first predetermined direction are greater than zero and less than the first angle.

5. The welding method according to claim 1, wherein each of the first composite material and the second composite material is formed by laminating a plurality of sheet materials containing the carbon fiber base material and the thermoplastic resin, and each of the first protection sheet, the second protection sheet, and the energization sheet is formed of a single sheet material containing the carbon fiber base material and the thermoplastic resin.

\* \* \* \* \*